United States Patent
Klostermann et al.

(10) Patent No.: US 11,965,064 B2
(45) Date of Patent: Apr. 23, 2024

(54) CROSSLINKED POLYETHER-SILOXANE BLOCK COPOLYMERS AND THEIR USE FOR PRODUCING POLYURETHANE FOAMS

(71) Applicant: Evonik Operations GmbH, Essen (DE)

(72) Inventors: Michael Klostermann, Essen (DE); Michael Ferenz, Essen (DE); Kai-Oliver Feldmann, Essen (DE); Marvin Jansen, Essen (DE); Michelle Fluder, Dortmund (DE); Sina Arnold, Bottrop (DE); Petra Schnell, Essen (DE)

(73) Assignee: Evonik Operations GmbH, Essen (DE)

( * ) Notice: Subject to any disclaimer, the term of this patent is extended or adjusted under 35 U.S.C. 154(b) by 813 days.

(21) Appl. No.: 16/966,914

(22) PCT Filed: Feb. 8, 2019

(86) PCT No.: PCT/EP2019/053108
§ 371 (c)(1),
(2) Date: Aug. 3, 2020

(87) PCT Pub. No.: WO2019/170360
PCT Pub. Date: Sep. 12, 2019

(65) Prior Publication Data
US 2021/0047474 A1    Feb. 18, 2021

(30) Foreign Application Priority Data

Mar. 5, 2018  (EP) .................................. 18159849

(51) Int. Cl.
| C08G 77/46 | (2006.01) |
| B01J 23/42 | (2006.01) |
| C08L 75/04 | (2006.01) |
| C08L 83/12 | (2006.01) |

(52) U.S. Cl.
CPC ............. *C08G 77/46* (2013.01); *B01J 23/42* (2013.01); *C08L 75/04* (2013.01); *C08L 83/12* (2013.01); *C08G 2110/0066* (2021.01); *C08L 2203/14* (2013.01); *C08L 2312/08* (2013.01)

(58) Field of Classification Search
CPC ............ C08G 77/46; C08G 2110/0066; C08G 77/08; B01J 23/42; C08L 75/04; C08L 83/12; C08L 2203/14; C08L 2312/08; C08J 9/00; C08J 2383/12
See application file for complete search history.

(56) References Cited

U.S. PATENT DOCUMENTS

| 3,836,560 | A | 9/1974 | Prokai et al. |
| 4,002,941 | A | 1/1977 | Demmy |
| 4,150,048 | A | 4/1979 | Schilling, Jr. et al. |
| 5,869,727 | A | 2/1999 | Crane et al. |
| 6,794,464 | B2 | 9/2004 | Jukarainen et al. |
| 6,887,948 | B2 | 5/2005 | Jukarainen et al. |
| 8,344,089 | B2 * | 1/2013 | Frey ....................... C08G 77/50 528/25 |
| 9,896,534 | B2 | 2/2018 | Lobert et al. |
| 10,023,679 | B2 | 7/2018 | Klostermann et al. |
| 10,160,832 | B2 | 12/2018 | Lobert et al. |
| 10,189,965 | B2 | 1/2019 | Krebs et al. |
| 10,287,454 | B2 | 5/2019 | Klotzbach et al. |
| 10,299,471 | B2 | 5/2019 | Hansel et al. |
| 10,351,687 | B2 | 7/2019 | Diendorf et al. |
| 10,407,546 | B2 | 9/2019 | Lobert et al. |
| 10,544,384 | B2 | 1/2020 | Scheuermann et al. |
| 10,995,174 | B2 | 5/2021 | Emmrich-Smolczyk et al. |
| 2010/0298485 | A1 | 11/2010 | Frey et al. |
| 2018/0016392 | A1 | 1/2018 | Lobert et al. |
| 2018/0327563 | A1 | 11/2018 | Klostermann et al. |
| 2019/0300728 | A1 | 10/2019 | Klostermann et al. |
| 2020/0039822 | A1 | 2/2020 | Melenkevitz et al. |
| 2020/0155436 | A1 | 5/2020 | Hartung et al. |
| 2020/0207938 | A1 | 7/2020 | Klostermann et al. |
| 2020/0216474 | A1 | 7/2020 | Fiedel et al. |
| 2020/0377684 | A1 | 12/2020 | Hermann et al. |
| 2021/0137276 | A1 | 5/2021 | Landers et al. |
| 2021/0214488 | A1 | 7/2021 | Emmrich-Smolczyk et al. |
| 2023/0002561 | A1 | 1/2023 | Lobert et al. |

FOREIGN PATENT DOCUMENTS

| CN | 101891892 A | 11/2010 | |
| DE | 69923992 T2 | 4/2006 | |
| DE | 102007055485 A1 * | 6/2009 | ............. C08G 77/08 |
| DE | 102008041601 A1 * | 3/2010 | ............. C08G 77/08 |

OTHER PUBLICATIONS

Ferenz et al., U.S. Appl. No. 17/523,059, filed Nov. 10, 2021.
Glos et al. U.S. Appl. No. 17/414,726, filed Jun. 16, 2021.
Klostermann et al., U.S. Appl. No. 17/612,663, filed Nov. 19, 2021.
Klostermann et al., U.S. Appl. No. 17/612,690, filed Nov. 19, 2021.
Klostermann et al., U.S. Appl. No. 17/617,020, filed Dec. 7, 2021.
Klostermann et al., U.S. Appl. No. 17/617,127, filed Dec. 7, 2021.
Modro et al., U.S. Appl. No. 17/367,456, filed Jul. 5, 2021.
Wagner et al., U.S. Appl. No. 17/391,664, filed Aug. 2, 2021.
Glos et al., U.S. Appl. No. 17/414,678, filed Jun. 16, 2021.
Herrmann et al., U.S. Appl. No. 17/448,240, filed Sep. 21, 2021.
Lobert et al., U.S. Appl. No. 17/142,947, filed Jan. 6, 2021.
Lobert et al., U.S. Appl. No. 17/706,552, filed Mar. 28, 2022.
Suchan et al., U.S. Appl. No. 17/239,087, filed Apr. 23, 2021.

(Continued)

*Primary Examiner* — Irina S Zemel
(74) *Attorney, Agent, or Firm* — Grüneberg and Myers PLLC

(57) ABSTRACT

Crosslinked polyether siloxane block copolymers are obtained by reacting an alpha-omega hydrogen siloxane with at least one higher-order hydrogen siloxane and at least one polyether in the presence of a hydrosilylation catalyst. These are described, and also use thereof as additives for producing polyurethane foams, particularly mechanically foamed polyurethane foams.

19 Claims, No Drawings

(56) References Cited

OTHER PUBLICATIONS

English International Search Report dated Mar. 14, 2019 in PCT/EP2019/053108 (2 pages).
German International Search Report dated Mar. 14, 2019 in PCT/EP2019/053108 (3 pages).
German Written Opinion dated Mar. 14, 2019 in PCT/EP2019/053108 (5 pages).
Hermann et al., U.S. Appl. No. 15/930,595, filed May 13, 2020.
Klostermann et al., U.S. Appl. No. 17/321,609, filed May 17, 2021.
Klostermann et al., U.S. Appl. No. 17/331,429, filed May 26, 2021.
Klostermann et al., U.S. Appl. No. 17/331,452, filed May 26, 2021.
Klostermann et al., U.S. Appl. No. 17/333,559, filed May 28, 2021.

* cited by examiner

CROSSLINKED POLYETHER-SILOXANE BLOCK COPOLYMERS AND THEIR USE FOR PRODUCING POLYURETHANE FOAMS

CROSS REFERENCE TO RELATED APPLICATIONS

This application is a 35 U.S.C. § 371 U.S. national phase entry of International Application No. PCT/EP2019/053108 having an international filing date of Feb. 8, 2019, which claims the benefit of European Application No. 18159849.1 filed Mar. 5, 2018, each of which is incorporated herein by reference in its entirety.

FIELD

The present invention is in the field of polyether siloxanes, foams and polyurethane foams.

It relates especially to the production of polyether siloxane copolymers constructed in blocks and also use thereof for producing polyurethane foams, preferably mechanically foamed polyurethane foams.

BACKGROUND

Mechanically foamed polyurethane foams are produced without using a physical or chemical blowing agent and are used in a wide variety of different coating processes. For instance, they are used for reverse side back foaming of carpets and synthetic turf, for producing surface seals, as impact sound insulation for floor coverings and also in the field of adhesive coatings. The relevant foams are produced in typical fashion by mechanical foaming of a polyol-isocyanate mixture, in which air or nitrogen are forced into the polyol-isocyanate mixture with high shear input. The foam material thus produced can then be coated on any desired substrate, for example a reverse side of a carpet, and cured at elevated temperatures. Due to their production, mechanically foamed polyurethane foams are also referred to as beaten foams in specialist circles.

For all applications mentioned above, it is important here that as far as possible a fine-cell foam is obtained during the mechanical foaming. In addition, it is necessary that the foam has high stability so that defects in the foam can be avoided during the subsequent coating and drying procedure. For this reason it is customary to add foam stabilizers to the polyol-isocyanate mixture before or during the mechanical foaming, wherein polyether siloxane block copolymers in particular have proven to be especially efficient for this application. In general, these stabilizers are characterized by a linear $[A13]_n$ block structure of alternating polyether and siloxane chains. In this case, the higher the molecular weight of these compounds, the higher the efficacy as foam stabilizer, wherein molar masses of more than 60,000 g/mol are not rare.

In most cases, SiOC-based polyether siloxane block copolymers are used for producing mechanically foamed polyurethane foams. These are polymers in which polyether and siloxane blocks are linked via a silicon-oxygen-carbon bond. Such structures are described by way of example in documents U.S. Pat. No. 3,836,560 or U.S. Pat. No. 4,002,941. The use of SiOC-based block copolymers is associated in this context with a series of disadvantages. To be emphasized in particular is a low stability to hydrolysis of such polyether siloxanes, which can have negative influences on their storage stability, especially in previously formulated polyol admixtures. Moreover, SiOC-based polyether siloxane block copolymers having sufficiently high molar masses are only accessible via complex production processes, whereby it is difficult to produce such structures in consistently high quality.

To avoid the disadvantages associated with SiOC-based structures, a series of SiC-based polyether siloxane block copolymers were also developed in the past in which polyether and siloxane blocks are linked to each other via a silicon-carbon bond. Such structures are described by way of example in documents U.S. Pat. No. 4,150,048 or U.S. Pat. No. 5,869,727. Advantages of this compound class are a distinctly increased stability to hydrolysis and also the fact that such molecules are in principle more readily accessible synthetically and therefore can be better produced in consistent quality. SiC-based polyether siloxane block copolymers can be produced in customary fashion by hydrosilylation of alpha-omega modified hydrogen siloxanes with alpha-omega modified di(meth)allyl polyethers. To provide block copolymers having sufficiently high molecular weight, it is important in this context that the chain ends of the polyether used has been modified virtually completely with (meth)allyl groups and has no, or hardly any, OH groups. In addition, rearrangements of the polyether-bound (meth)allyl double bonds must be reduced to a minimum since the double bonds would be unreactive to hydrosilylation in this case. In this context, owing to the very low tendency of methallylic double bonds to rearrange, dimethallyl-modified polyethers are to be preferred to diallyl-modified polyethers for producing high molecular weight polyether siloxane block copolymers.

However, incomplete modifications and rearrangements on the polyether can never be completely avoided such that the production of SiC-based, linear $[A13]_n$ polyether siloxane block copolymers always results in chain terminations which limits the molecular weight that is synthetically accessible. As already described, however, a high molecular weight is particularly important for the provision of particularly effective foam stabilizers for mechanically foamed polyurethane foams. The object of the present invention was therefore the provision of polyether siloxane block copolymers which have the advantages of SiC— compared to SiOC-based structures, but which are characterized by a particularly high molecular weight and, associated thereto, a particularly efficient efficacy as foam stabilizer. It has been found that, surprisingly, the use of crosslinked polyether siloxane block copolymers enables the object specified to be achieved.

SUMMARY

The present invention therefore relates to crosslinked polyether siloxane block copolymers, and to the use thereof for producing polyurethane foams, preferably for producing mechanically foamed polyurethane foams.

DETAILED DESCRIPTION

The crosslinked polyether siloxane block copolymers according to the invention have many surprising advantages.

One advantage of the crosslinked polyether siloxane block copolymers according to the invention is that they are accessible via a preparation process that is simple to carry out, in which it is possible to produce such structures even in relatively large amounts in consistent quality.

Another advantage of the crosslinked polyether siloxane block copolymers according to the invention is that they are amenable to polyether siloxane block copolymers having very high molecular weights.

The synthetically readily accessible high molecular weight is advantageous in this context, particularly for the use according to the invention of the polyether siloxane block copolymers described as foam stabilizer for producing polyurethane foams, especially polyurethane beaten foams, since they can produce in this case particularly fine-celled and stable foams. Also in this case, a particularly efficient mechanical foaming of polyol-isocyanate mixtures is possible, which in turn is associated with a series of process engineering advantages in the production of polyurethane beaten foams.

A further advantage of the polyether siloxane block copolymers according to the invention is that they have a high stability to hydrolysis. These corresponding structures have high storage stability which is associated with considerable advantages, especially in previously formulated polyol admixtures.

In the context of the entire present invention, the term polyether includes polyoxyalkylenes, preference being given particularly to polyoxyethylene and polyoxypropylene and also to polyoxyethylene-polyoxypropylene mixed polyethers. The distribution of various oxyalkylene units along the polymer backbone may be different. Mixed polyethers can be constructed, for example, statistically, in blocks or having different gradients of the monomer units to each other. Statistical construction in this context signifies that the polyoxyethylene and polyoxypropylene units are distributed in a random sequence across the polyether chain, whereas a blockwise constructed polyether consists of defined polyoxyethylene and polyoxypropylene blocks.

In the context of the entire present invention, the term siloxane includes compounds from the class of polyorganosiloxanes, the class of polydimethylsiloxanes being especially preferred.

In the context of the entire present invention, the term polyether siloxane block copolymers includes polymers which are constructed from alternating polyether and siloxane blocks. In this case, these structures can be both linear and branched.

The term polyurethane foam is known per se to those skilled in the art (see, for example, Adam et al., "Polyurethanes", Ullmann's Encyclopedia of Industrial Chemistry—Paragraph 7", 2012, Wiley VCH-Verlag, Weinheim). In the context of the entire present invention, the term polyurethane beaten foam includes polyurethane foams which are produced by mechanical beating of air/nitrogen into a polyol-isocyanate mixture, in which only small amounts of, preferably no additional physical or chemical blowing agents are used. It is synonymous with the term mechanically foamed polyurethane foam.

The polyether siloxane block copolymers according to the invention are based on Si—C chemistry and can be produced by hydrosilylation of alpha-omega modified hydrogen siloxanes, higher-order pendant or branched hydrogen siloxanes and also alpha-omega modified di(meth)allyl polyethers. The chemical reactions on which this production is based are known in the technical literature and are described in detail therein (see, for example, Silicones—Chemistry and Technology, Vulkan-Verlag Essen, 1989).

The invention is described further and by way of example hereinafter, without any intention that the invention be restricted to these illustrative embodiments. When ranges, general formulae or classes of compounds are specified below, these are intended to encompass not only the corresponding ranges or groups of compounds which are explicitly mentioned but also all subranges and subgroups of compounds which can be obtained by leaving out individual values (ranges) or compounds. When documents are cited in the context of the present description, the contents thereof, particularly with regard to the subject matter that forms the context in which the document has been cited, are considered in their entirety to form part of the disclosure content of the present invention. Unless stated otherwise, percentages are figures in percent by weight. When parameters which have been determined by measurement are reported below, the measurements have been carried out at a temperature of 25° C. and a pressure of 101 325 Pa, unless stated otherwise. Where chemical (empirical) formulae are used in the present invention, the specified indices may be not only absolute numbers but also average values. The indices relating to polymeric compounds are preferably average values. The structure and empirical formulae presented in the present invention are representative of all isomers feasible by differing arrangement of the repeating units. Where, in the context of the present invention, compounds, such as e.g. polyethers, siloxanes or polyether siloxanes, are described which can have different units multiple times, then these can occur in statistical distribution (statistical oligomer or polymer), arranged (block oligomer or block polymer) or as gradient distribution in these compounds.

The invention relates to polyether siloxane block copolymers which are accessible by reacting a) at least one alpha-omega hydrogen siloxane of general formula (1)

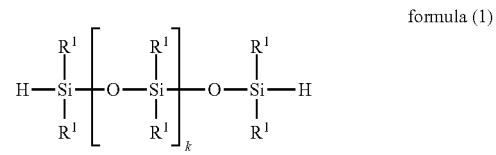

formula (1)

wherein k=1 to 100, preferably 5 to 50, particularly preferably 7 to 30, especially preferably 8-20 and wherein the radicals $R^1$ are each independently identical or different monovalent aliphatic or aromatic hydrocarbon radicals having 1 to 20 carbon atoms, preferably having 1 to 10 carbon atoms, especially preferably methyl radicals, b) and at least one higher-order hydrogen siloxane of general formula (2)

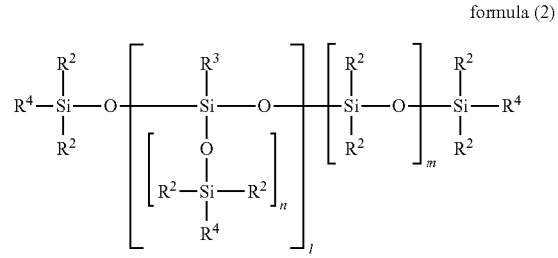

formula (2)

wherein l=1 to 10, preferably 1 to 5, particularly preferably 1 m=0 to 100, preferably 5 to 50, particularly preferably 7 to 30, especially preferably 8-20 n=0 to 100, preferably 0-50, particularly preferably is 0 and wherein the radicals $R^2$ are each independently identical or different monovalent aliphatic or aromatic hydrocarbon radicals having 1 to 20 carbon atoms, preferably having 1 to 10 carbon atoms, especially preferably methyl radicals, and wherein the radicals $R^3$ are each independently identical or different monovalent aliphatic or aromatic hydrocarbon radicals having 1 to 20 carbon atoms, preferably methyl or phenyl radicals, and wherein the radicals $R^4$ are each independently identical or different monovalent aliphatic or aromatic hydrocarbon radicals having 1 to 20 carbon atoms, or are H, with the proviso that at least three, preferably all $R^4$ radicals are hydrogen atoms, c) with at least one polyether of general formula (3)

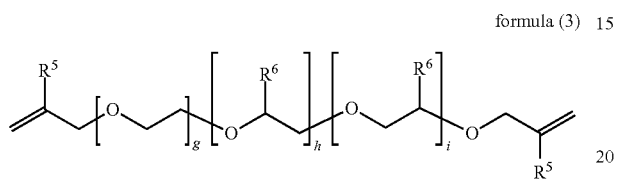

formula (3)

wherein
g=0 to 100, preferably 5 to 75, particularly preferably 10 to 50
h=0 to 100, preferably 5 to 75, particularly preferably 5 to 25
i=0 to 100, preferably 5 to 75, particularly preferably 5 to 25 and
wherein the radicals $R^5$ are each independently identical or different monovalent aliphatic saturated or unsaturated hydrocarbon radicals having 1 to 20 carbon atoms or are H, wherein preference is given in particular to methyl radicals, and wherein the radicals $R^6$ are each independently identical or different monovalent aliphatic or aromatic hydrocarbon radicals having 1 to 20 carbon atoms, preferably methyl radicals, in the presence of a hydrosilylation catalyst (d), wherein the reaction is carried out optionally, preferably mandatorily, in a solvent (e). The polyether siloxane block copolymers according to the invention are crosslinked. The aforementioned reaction, i.e. the process for producing the polyether siloxane block copolymers, is also a subject matter of the invention as such.

The crosslinked polyether siloxane block copolymers according to the invention are therefore produced in the presence of a hydrosilylation catalyst which is capable of catalysing the formation of an SiC bond by addition of an Si—H group to a (meth) allylic double bond. These are particularly catalysts selected from the group of platinum catalysts, the platinum (0) catalysts being particularly preferred, wherein in particular platinum (0) catalysts in the form of the Karstedt catalyst (Lewis et al., "Platinum Catalysts used in Silicones Industry", Platinum Metal Review, 1997, 44(23), 66-74) are especially preferred.

In the context of the present invention, it is preferable in the production of the crosslinked polyether siloxane block copolymers according to the invention that the higher-order hydrogen siloxane (b) is used at a concentration of 3-25, preferably 5-20, particularly preferably 7.5— mol %, based on the mixture of both hydrogen siloxanes (a) and (b).

It corresponds to another likewise preferred embodiment of the present invention if, for producing the crosslinked polyether siloxane block copolymers according to the invention, the alpha-omega hydrogen siloxane of general formula (1) and the higher-order hydrogen siloxane of general formula (2) are not initially charged separately, but a siloxane mixture comprising alpha-omega hydrogen siloxanes and higher-order hydrogen siloxanes is produced directly by equilibration, which is then reacted directly with a polyether of general formula (3). Appropriate equilibration methods for producing a corresponding siloxane mixture are known to those skilled in the art and are described, for example, in "Silicones—Chemistry and Technology" (Vulkan-Verlag Essen, 1989). This siloxane mixture is then reacted directly with a polyether of general formula (3). In this case in particular, preference is given to those siloxane mixtures which correspond to general formula (4):

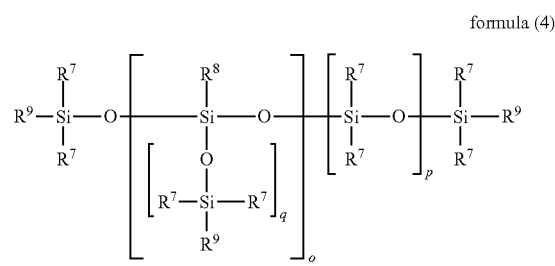

formula (4)

wherein
o=0.01 to 0.7, preferably 0.05 to 0.5, particularly preferably 0.075 to 0.25
p=0 to 100, preferably 5 to 50, particularly preferably 7 to 30, especially preferably 8-20
q=0 to 100, preferably 0-50, particularly preferably is 0 and wherein the radicals $R^7$ are each independently identical or different monovalent aliphatic or aromatic hydrocarbon radicals having 1 to 20 carbon atoms, preferably having 1 to 10 carbon atoms, especially preferably methyl radicals, and wherein the radicals $R^8$ are each independently identical or different monovalent aliphatic or aromatic hydrocarbon radicals having 1 to 20 carbon atoms, preferably methyl or phenyl radicals, and wherein the radicals $R^9$ are each independently identical or different monovalent aliphatic or aromatic hydrocarbon radicals having 1 to 20 carbon atoms, or are H, with the proviso that at least 50%, preferably 65%, particularly preferably at least 80% of the $R^9$ radicals are hydrogen atoms.

In the context of the present invention, it is furthermore preferable if, in the production of the crosslinked polyether siloxane block copolymers according to the invention, the polyether (c) is used at such a concentration that the molar ratio of polyether-bonded double bonds to siloxane-bonded Si—H groups is in the range of 0.95:1.05, preferably in the range of 0.97:1.03, particularly preferably in the range of 0.99:1.01.

In the context of the present invention, preference is further given to those crosslinked polyether siloxane block copolymers having an average molecular weight $M_w$ of at least 60,000 g/mol, preferably of at least 70,000 g/mol, particularly preferably of at least 80,000 g/mol. The average molecular weight $M_w$ can be determined in this case preferably by gel permeation chromatography (GPC). For this purpose, for example, it is possible to use the GPC system SECcurity$^2$ from PCC, calibrated against polypropylene glycol.

The crosslinked polyether siloxane block copolymers according to the invention may, due to their high molecular weight, have a high viscosity. It may therefore be advantageous if the polyether siloxane block copolymers are present diluted in a suitable solvent. For this purpose, the polyether siloxane block copolymers can be produced directly in a solvent but they can also be diluted or admixed with the solvent subsequently. Polyether siloxane block copolymers which have been produced directly in a solvent are particularly preferred in the context of the present invention. In this context, preference is given in particular to alkylbenzenes, alcohols, preferably having at least 10 carbon atoms, long-chain fatty acid esters, polyethers, and also mixtures of these substances as solvent, wherein in particular isotridecanol, dodecanol and isopropyl stearate are especially preferred solvents.

If the crosslinked polyether siloxane block copolymers according to the invention are present diluted in a solvent, it is particularly preferable in the context of the present invention if the concentration of the polyether siloxane block copolymer is in the range of 5-95% by weight, more preferably 10-90% by weight, particularly preferably 20-80% by weight, especially preferably 30-70% by weight, based on the mixture of copolymer and solvent.

Since, as described above, the crosslinked polyether siloxane block copolymers are efficient stabilizers for the production of polyurethane foams, especially polyurethane beaten foams, the use of the polyether siloxane block copolymers according to the invention as additives for producing corresponding foams is also a subject matter of the present invention.

For this purpose, it is preferable in the context of the present invention if, in the production of polyurethane foams, especially polyurethane beaten foams, the polyether siloxane block copolymers according to the invention are used at a concentration of 0.05-10% by weight, preferably 0.1-7.5% by weight, particularly preferably 0.2-5% by weight, based on the overall foam composition.

The term polyurethane foam in this context refers to foams which are formed by reacting polyisocyanates with compounds reactive towards them, preferably having OH groups ("polyols") and/or NH groups (Adam et al., "Polyurethanes", Ullmann's Encyclopedia of Industrial Chemistry", 2012, Wiley VCH-Verlag, Weinheim). Polyols for producing corresponding foams are known per se. Particularly suitable polyols for the purposes of this invention are any of the organic substances having a plurality of groups reactive towards isocyanates, and also preparations of said substances. Preferred polyols are any of the polyether polyols and polyester polyols usually used for the production of polyurethane foams. Polyether polyols are obtainable by reacting polyhydric alcohols or amines with alkylene oxides. Polyester polyols are based on esters of polybasic carboxylic acids (mostly phthalic acid, adipic acid or terephthalic acid) with polyhydric alcohols (mostly glycols).

Isocyanates for producing polyurethane foams are likewise known per se. The isocyanate component preferably comprises one or more organic isocyanates having two or more isocyanate functions. Examples of suitable isocyanates for the purposes of this invention are any of the polyfunctional organic isocyanates, for example diphenylmethane 4,4'-diisocyanate (MDI), toluene diisocyanate (TDI), hexamethylene diisocyanate (HMDI) and isophorone diisocyanate (IPDI). Particularly suitable are also isocyanate-based prepolymers, especially MDI-based prepolymers.

In the context of the present invention, the ratio of isocyanate to polyol, expressed as the NCO index, is preferably in the range from 40 to 500, preferably 60 to 350, particularly preferably 80-120. The NCO index describes the ratio of isocyanate actually used to calculated isocyanate (for a stoichiometric reaction with polyol). An NCO index of 100 represents a molar reactive group ratio of 1:1.

In addition to the crosslinked polyether siloxane block copolymers according to the invention, the polyurethanes may also comprise further additives and auxiliaries such as, for example, fillers, blowing agents, catalysts, organic and inorganic pigments, stabilizers such as, for example, hydrolysis or UV stabilizers, antioxidants, absorbers, crosslinkers, dyes or thickeners/rheology additives.

Furthermore, in the production of polyurethane foams, especially polyurethane beaten foams, in addition to the crosslinked polyether siloxane block copolymers according to the invention, at least one further polyether siloxane of general formula (5) may be used as additive:

formula (5)

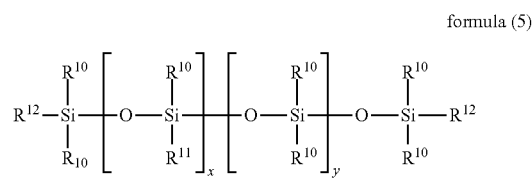

wherein x=0 to 50, preferably 1 to 25, particularly preferably 2 to 15 y=0 to 250, preferably 5 to 150, particularly preferably 5 to 100 wherein the radicals $R^{10}$ are each independently identical or different monovalent aliphatic or aromatic hydrocarbon radicals having 1 to 20 carbon atoms, preferably 1 to 10 carbon atoms, especially preferably are methyl radicals, and wherein the radicals $R^{11}$ are each independently identical or different polyoxyalkylene radicals, preferably polyoxyethylenepolyoxypropylene radicals, preferably having 2-100, particularly preferably 4-75 oxyalkylene units, and wherein the radicals $R^{12}$ correspond to either $R^{10}$ or $R^{11}$. Polyoxyalkylene radicals in this case can be both OH-functional and terminated, preference in this case being given in particular to methyl-terminated and acetyl-terminated polyoxyalkylene radicals.

It is particularly preferable in this context if the polyether siloxane of general formula (5) is used at a concentration of 10-90% by weight, preferably 20-80% by weight, particularly preferably –70% by weight, based on the mixture of polyether siloxane block copolymer and polyether siloxane of general formula (5).

In the context of the present invention, particularly suitable catalysts for producing polyurethane foams, especially polyurethane beaten foams, are gel catalysts which catalyse the polyurethane reaction between isocyanate and polyol. These may be selected from the class of amine catalysts, such as e.g. triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethylaminoethoxyethanol, tetramethylguanidine, and 1,8-diazabicyclo[5.4.0]undec-7-ene.

Furthermore, amine catalysts can be selected from the class of so-called emission-free amine catalysts which are characterized in that they have a catalytically active nitrogen atom and a group reactive towards NCO groups such as, for example, an OH group. Appropriate emission-free amine catalysts are marketed, for example under the product series Dabco NE from Evonik. In addition, the catalysts can be selected from the class of metal catalysts such as e.g. tin, zinc, bismuth, iron, copper or zirconium-based catalysts. Metal catalysts in this context may be in the form of salts or as organically modified catalysts such as e.g. tin laurate, tin octoate, tin neodecanoate, or nickel and copper acetylacetonate. The catalysts mentioned above can be used either in pure form or as catalyst mixtures. In the case of polyurethane beaten foams, particularly suitable are thermolatent catalysts, that is to say catalysts which only develop efficacy from a certain activation temperature and therefore enable a delayed curing of the foams.

In the context of the present invention, the polyurethane foams are preferably polurethane beaten foams which are produced by mechanically beating the isocyanate mixture. Such beaten foams preferably comprise less than 2% by weight, particularly preferably less than 1% by weight, more preferably less than 0.5% by weight, especially preferably less than 0.1% by weight of a chemical or physical blowing agent. The polyurethane foams especially preferably comprise no physical or chemical blowing agent.

As already described, the use of the polyether siloxane block copolymers according to the invention for producing polyurethane beaten foams is a particularly preferred subject matter of the present invention. Preferably, such polyurethane beaten foams can be produced by a process comprising the steps of
a) providing a polyol component, an isocyanate component, at least one of the polyether siloxane block copolymers according to the invention and optionally further additives
b) mixing all components to give a homogeneous mixture
c) mechanically beating the mixture while introducing a gas such as air or nitrogen to give a homogeneous fine-celled foam
d) applying the foamed reaction mixture to a substrate
e) curing the foamed reaction mixture It is made clear that the process steps of this process as set out above are not subject to any fixed sequence in time. For instance, process step b) and c) can be carried out simultaneously, that is to say individual components are only added to the reaction mixture during the foaming procedure and mixed at this point. Individual additives, such as the catalyst for example, can also be added only after process step c) for the mechanically foamed reaction mixture.

It is a preferred embodiment of the present invention when, in process step c), the reaction mixture of polyol, isocyanate and optionally further additives is foamed by the application of high shear forces. The foaming can be effected here with the aid of shear units familiar to the person skilled in the art, for example Dispermats, dissolvers, Hansa mixers or Oakes mixers.

It is additionally preferable if the mechanically foamed reaction mixture after process step c) has a density in the range of 50-1000 g/l, preferably in the range of 75-600 g/l, particularly preferably in the range of 100-450 g/l.

In process step d), the reaction mixture can be applied to virtually any desired substrate such as e.g. carpet backings, the backings of synthetic turf, adhesive coatings, textile carrier webs, release liners or release films and also to metals, either to be left on the metal permanently or for the later removal of the cured reaction mixture.

It is furthermore preferable if in process step e) the foamed reaction mixture is cured at elevated temperatures. Preference is given here in accordance with the invention to curing temperatures of at least 50° C., preferably of 60° C., more preferably of at least 70° C.

Since the polyether siloxane block copolymers according to the invention offer major advantages in the production of polyurethane foams, especially polyurethane beaten foams, foams produced with the polyether siloxane block copolymers described, especially beaten foams, are a further subject matter of the present invention. Corresponding polyurethane foams may be used, for example, for producing floor coverings such as carpets, impact sound insulation or synthetic turf and also for producing textile coatings, adhesive coatings or sealing materials.

EXAMPLES

Synthesis Examples

Example 1: Synthesis of OMS 1 (Comparative Example)

25.0 g of a siloxane of general formula (1) where $R^1$=Me and k=13.2 are mixed with 64.5 g of a polyether of general formula (3) where $R^5$=$R^6$=Me, g=37 and h+i=18.5 and 89.5 g of isotridecanol in a 500 mL three-neck flask equipped with KPG stirrer and reflux condenser. The mixture is heated under a blanket of nitrogen to 90° C. Subsequently, 0.12 g of a solution of Karstedt catalyst in decamethylcyclopentasiloxane (1.5% Pt) are added to the reaction mixture. An exothermic reaction sets in. The reaction mixture is stirred at 90° C. for 4 h.

A clear, highly viscous product was obtained. The polymer formed had an average molar mass $M_w$ of 71 000 g/mol (measured using GPC system SECcurity$^2$ from PCC, calibrated against polypropylene glycol).

Example 2: Synthesis of OMS 2

15.0 g of a siloxane of general formula (4) where $R^7$=$R^8$=Me, $R^9$=H, p=13.4, q=0 and o=0.15 are mixed with 38.3 g of a polyether of general formula (3) where $R^5$=$R^6$=Me, g=36 and h+i=16.5 and 53.3 g of isotridecanol in a 250 mL three-neck flask equipped with KPG stirrer and reflux condenser. The mixture is heated under a blanket of nitrogen to 90° C. Subsequently, g of a solution of Karstedt catalyst in decamethylcyclopentasiloxane (1.5% Pt) are added to the reaction mixture. An exothermic reaction sets in. The reaction mixture is stirred at 90° C. for 4 h.

A clear, highly viscous product was obtained. The polymer formed had an average molar mass $M_w$ of 85 000 g/mol (measured using GPC system SECcurity$^2$ from PCC, calibrated against polypropylene glycol).

Example 3: Synthesis of OMS 3

15.0 g of a siloxane of general formula (4) where $R^7$=Me, $R^8$=phenyl, $R^9$=H, p=q=13.4 and o=0.05 are mixed with 34.9 g of a polyether of general formula (3) where $R^5$=$R^6$=Me, g=36 and h+i=16.5 and 49.9 g of isotridecanol in a 250 mL three-neck flask equipped with KPG stirrer and reflux condenser. The mixture is heated under a blanket of nitrogen to 90° C. Subsequently, 0.07 g of a solution of Karstedt catalyst in decamethylcyclopentasiloxane (1.5% Pt) are added to the reaction mixture. An exothermic reaction sets in. The reaction mixture is stirred at 90° C. for 4 h.

A clear, highly viscous product was obtained. The polymer formed had an average molar mass $M_w$ of 78 000 g/mol (measured using GPC system SECcurity$^2$ from PCC, calibrated against polypropylene glycol).

Example 4: Synthesis of OMS 4

12.8 g of a siloxane of general formula (1) where $R^1$=Me and k=13.2 are mixed with 2.3 g of a siloxane of general formula (2) where $R^2$=$R^3$=Me, $R^4$=H, m=13.2,1=1, n=0 and 38.3 g of a polyether of general formula (3) where $R^5$=$R^6$=Me, g=37 and h+i=18.5, and 53.4 g of isotridecanol in a 250 mL three-neck flask equipped with KPG stirrer and reflux condenser. The mixture is heated under a blanket of nitrogen to 90° C. Subsequently, 0.12 g of a solution of Karstedt catalyst in decamethylcyclopentasiloxane (1.5% Pt) are added to the reaction mixture. An exothermic reaction sets in. The reaction mixture is stirred at 90° C. for 4 h.

A clear, highly viscous product was obtained. The polymer formed had an average molar mass $M_w$ of 79 000 g/mol (measured using GPC system SECcurity² from PCC, calibrated against polypropylene glycol).

Example 5: Synthesis of OMS 5

12.8 g of a siloxane of general formula (1) where $R^1$=Me and k=13.2 are mixed with 2.3 g of a siloxane of general formula (2) where $R^2$=$R^3$=Me, $R^4$=H, m=13.2,1=1, n=0 and 28.0 g of a polyether of general formula (3) where $R^5$=$R^6$=Me, g=20 and h+i=16, and 43.1 g of dodecylbenzene in a 250 mL three-neck flask equipped with KPG stirrer and reflux condenser. The mixture is heated under a blanket of nitrogen to 90° C. Subsequently, 0.12 g of a solution of Karstedt catalyst in decamethylcyclopentasiloxane (1.5% Pt) are added to the reaction mixture. An exothermic reaction sets in. The reaction mixture is stirred at 90° C. for 4 h.

A clear, highly viscous product was obtained. The polymer formed had an average molar mass $M_w$ of 72 000 g/mol (measured using GPC system SECcurity² from PCC, calibrated against polypropylene glycol).

Example 6: Synthesis of OMS 6

19.0 g of a siloxane of general formula (4) where $R^7$=$R^8$=Me, $R^9$=H, p=18.0, q=0 and o=0.17 are mixed with 39.0 g of a polyether of general formula (3) where $R^5$=$R^6$=Me, g=36 and h+i=16.5 and 58 g of isotridecanol in a 250 mL three-neck flask equipped with KPG stirrer and reflux condenser. The mixture is heated under a blanket of nitrogen to 90° C. Subsequently, g of a solution of Karstedt catalyst in decamethylcyclopentasiloxane (1.5% Pt) are added to the reaction mixture. An exothermic reaction sets in. The reaction mixture is stirred at 90° C. for 4 h.

A clear, highly viscous product was obtained. The polymer formed had an average molar mass $M_w$ of 81 000 g/mol (measured using GPC system SECcurity² from PCC, calibrated against polypropylene glycol).

Polyurethane Formulations:

To assess the effectiveness of polyether siloxane block copolymers as stabilizers for the production of polyurethane beaten foams, a series of test foamings was conducted in various polyurethane formulations. For this purpose, the polyols listed in Table 1 were used.

TABLE 1

Overview of polyols used in foaming experiments.

| Polyol | Producer/supplier | Composition |
|---|---|---|
| Voranol CP 3322 | Dow | EO/PO polyether polyol<br>OHN = 48 mg KOH/g; f ≈ 3 |
| Voranol CP 755 | Dow | Polyether polyol<br>OHN = 247 mg KOH/g; f ≈ 3 |
| Voranol P 400 | Dow | Polypropylene glycol<br>OHN = 267 mgKOH/g; f ≈ 2 |
| Voranol 2000 L | Dow | EO/PO polyether polyol<br>OHN = 56 mg KOH/g; f ≈ 2 |
| Voralux HL 109 | Dow | SAN polymer polyether polyol<br>OHN = 42 mg KOH/g; f ≈ 3 |
| Voralux HN 360 | Dow | SAN polymer polyether polyol<br>OHN = 30 mg KOH/g, f ≈ 3 |
| Capa 2054 | Perstorp | Caprolactone-based polyester polyol<br>OHN = 204 mg KOH/g, f = 2 |
| DPG | Sigma Aldrich | Dipropylene glycol<br>OHN = 836 mg KOH/g, f = 2 |

In addition, the following substances were used for test foamings:

Kosmos N 200: nickel (II) acetylacetonate in polyol (catalyst), from Evonik Nutrition & Care GmbH Omya BLS: calcium carbonate (filler), from Omya GmbH Suprasec 6506: polymeric MDI (NCO %=29.3%) from Huntsman Table 2 gives a detailed overview of the polyurethane formulations used in the test foamings.

TABLE 2

Polyurethane formulations; all data in parts by weight

| Substance | F1 | F2 | F3 | F4 |
|---|---|---|---|---|
| Voranol CP 3322 | 140 | 140 | — | — |
| Voranol CP 755 | — | — | 7 | 7 |
| Voranol P 400 | — | — | 20 | 20 |
| Voranol 2000 L | — | — | 111 | 111 |
| Voralux HL 109 | — | — | 16 | 16 |
| Voralux HN 360 | 60 | 60 | — | — |
| Capa 2054 | — | — | 32 | 32 |
| DPG | 30 | 30 | 26 | 26 |
| CaCO3 | — | 100 | — | 100 |
| Kosmos N 200 | 4 | 4 | 4 | 4 |
| Stabilizer | 4 | 4 | 4 | 4 |
| Suprasec 6506 | 90 NCO index = 105 | 90 NCO index = 105 | 114 NCO index = 104 | 90 NCO index = 104 |

Example 7: Manual Foaming

Manual foaming operations were carried out using a dissolver, Dispermat® LC75 model from VMA-Getzman, equipped with a dissolver disc, 0=6 cm. For this purpose, firstly polyols, stabilizer, catalyst and optionally calcium carbonate in the appropriate ratio were weighed into a 1000 ml plastic beaker and stirred at ca. 500 rpm for 3 minutes to give a homogeneous mixture.

Isocyanate was then added and the mixture was foamed for 3 minutes at 2200 rpm. Care was taken here that the dissolver disc was always immersed sufficiently into the mixture that a proper vortex was formed. The density of the reaction mixture foamed in this way was used as an evaluation criterion for the effectiveness of the foam stabilizer. The foamed reaction mixture was then painted onto a coated release paper, using a film drawing apparatus of the AB3220 type from TQC, equipped with a 2 mm round doctor blade, and cured for 15 minutes at 120° C. Cell structure and cell homogeneity of the cured foam were a further evaluation criterion for the effectiveness of the foam stabilizer.

The formulations F1-F4 were foamed according to this process; the batch size of the respective experiments was always ca. 330 g in the case of unfilled formulations and ca. 430 g in the case of $CaCO_3$-containing formulations. For these experiments, polyether siloxane block copolymers that are either uncrosslinked, described in comparative example 1, or crosslinked, described in examples 2, 3 and 6, were used as stabilizer. Table 3 gives an overview of the densities of the foamed reaction mixtures which were obtained after foaming in these experiments.

TABLE 3

Results of manual foaming operations

| | F1 | F2 | F3 | F4 |
|---|---|---|---|---|
| Uncrosslinked polyether siloxane block copolymer of example 1 | | | | |
| Density after foaming | 610 g/l | 715 g/l | 600 g/l | 650 g/l |
| Crosslinked polyether siloxane block copolymer of example 2 | | | | |
| Density after foaming | 570 g/l | 685 g/l | 490 g/l | 590 g/l |
| Crosslinked polyether siloxane block copolymer of example 3 | | | | |
| Density after foaming | 560 g/l | 690 g/l | 450 g/l | 580 g/l |
| Crosslinked polyether siloxane block copolymer of example 6 | | | | |
| Density after foaming | 580 g/l | 700 g/l | 510 g/l | 610 g/l |

As can be seen from this summary, in all cases lower foam densities were obtained using the crosslinked polyether siloxane block copolymers according to the invention. In the evaluation of the cured foam samples, it was noticeable in addition that samples which had been produced with the inventive siloxane had a finer and more homogeneous cell structure. Both are evidence of the better effectiveness of these structures as foam stabilizers for the production of polyurethane beaten foams.

Example 8: Machine Foaming Operations

Machine foaming operations were conducted using a fully automatic laboratory foam generator, Pico Mix XL type from Hansa-Mixer, equipped with 2 separate eccentric spiral hopper pumps. For this purpose, firstly a premixture (batch size ca. 5 kg) of polyols, stabilizer, catalyst and optionally calcium carbonate was prepared and then filled into one of the two hopper pumps of the foam generator. The other hopper pump was filled with the isocyanate component. For the foaming experiments, polyol premixture and isocyanate were simultaneously injected into the mixing head of the foam generator and foamed therein by simultaneous introduction of air. The mixing head was operated here at 850 rpm in all experiments. The flow rates of both hopper pumps were continuously adjusted so that polyol and isocyanate were injected into the mixing head in the appropriate ratio (corresponding to the NCO index of the respective formulation), the total mass flow being about 5-8 kg/h (depending on the selected formulation, on the filler content etc.). The air flow into the mixing head was selected so that foam densities of 200 and 400 g/l were obtained after foaming. The homogeneity and stability of the foam obtained on discharge from the mixing head was an evaluation criterion for the effectiveness of the foam stabilizer. The foamed reaction mixture was then painted (layer thickness ca. 6 mm) onto a coated release paper using a laboratory coating table/dryer, Labcoater LTE-S from Mathis AG, and cured at 120° C. for 15 minutes. Cell structure and cell homogeneity of the cured foam were a further evaluation criterion for the effectiveness of the foam stabilizer.

TABLE 4

Results of machine foaming operations

| | F1 | F2 | F3 | F4 |
|---|---|---|---|---|
| Uncrosslinked polyether siloxane block copolymer of example 1 | | | | |
| Foam stability | ○ | ○ | ○ | ○ |
| Foam homogeneity | ○ | ○ | ○ | ○ |
| Crosslinked polyether siloxane block copolymer of example 2 | | | | |
| Foam stability | ++ | ++ | +++ | ++ |
| Foam homogeneity | ++ | + | ++ | ++ |
| Crosslinked polyether siloxane block copolymer of example 3 | | | | |
| Foam stability | ++ | + | + | + |
| Foam homogeneity | + | ○ | ++ | + |
| Crosslinked polyether siloxane block copolymer of example 4 | | | | |
| Foam stability | +++ | ++ | ++ | + |
| Foam homogeneity | ++ | + | + | ++ |
| Crosslinked polyether siloxane block copolymer of example 5 | | | | |
| Foam stability | + | ○ | ++ | ○ |
| Foam homogeneity | + | + | + | ++ |
| Crosslinked polyether siloxane block copolymer of example 5 | | | | |
| Foam stability | + | ○ | + | + |
| Foam homogeneity | ○ | + | + | ○ |

Formulations F1-F4 were foamed according to this process. For these experiments, polyether siloxane block copolymers that are either uncrosslinked, described in comparative example 1, or partially crosslinked, described in examples 2-6, were used as stabilizer. In these experiments also, in all cases a better effectiveness of the inventive crosslinked polyether siloxane block copolymers as stabilizer was observed. For instance, the foams obtained were characterized by higher stability and a finer and more homogeneous cell structure. Table 4 gives an overview of the results obtained in these experiments.

The invention claimed is:

1. A polyether siloxane block copolymer producing polyurethane, foams, the polyether siloxane block copolymer comprising a polyether siloxane block copolymer obtained by reacting
   a) at least one alpha-omega hydrogen siloxane of formula (1)

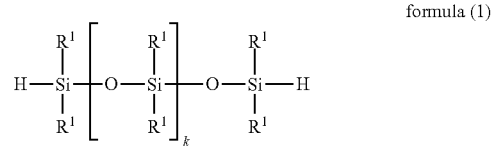

formula (1)

wherein
k=1 to 100, and
wherein the radicals R' are each independently identical or different monovalent aliphatic or aromatic hydrocarbon radicals having 1 to 20 carbon atoms, b) and at least one higher-order hydrogen siloxane of formula (2)

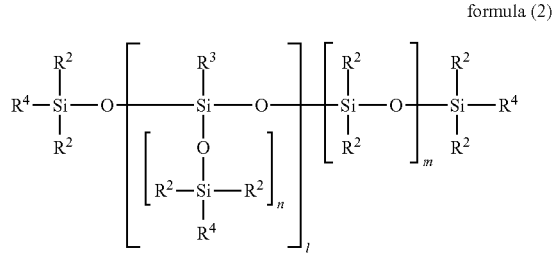
formula (2)

wherein l=1 to 10, m=0 to 100, n=0 to 100, and wherein the radicals $R^2$ are each independently identical or different monovalent aliphatic or aromatic hydrocarbon radicals having 1 to 20 carbon atoms, and wherein the radicals $R^3$ are each independently identical or different monovalent aliphatic or aromatic hydrocarbon radicals having 1 to 20 carbon atoms, and wherein the radicals $R^4$ are each independently identical or different monovalent aliphatic or aromatic hydrocarbon radicals having 1 to 20 carbon atoms, or are H, wherein at least three $R^4$ radicals are hydrogen atoms, c) with at least one polyether of formula (3)

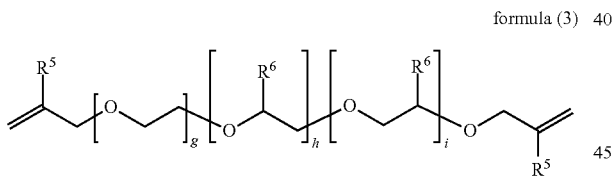
formula (3)

wherein g=0 to 100, h=0 to 100, i=0 to 100, and wherein the radicals $R^5$ are each independently identical or different monovalent aliphatic saturated or unsaturated hydrocarbon radicals having 1 to 20 carbon atoms or are H, and wherein the radicals $R^6$ are each independently identical or different monovalent aliphatic or aromatic hydrocarbon radicals having 1 to 20 carbon atoms, in the presence of a hydrosilylation catalyst (d), wherein the reaction is carried out optionally in a solvent (e).

2. The polyether siloxane block copolymer according to claim 1, wherein the higher-order hydrogen siloxane (b) is used at a concentration of 3-25, based on the mixture of both hydrogen siloxanes (a) and (h).

3. The polyether siloxane block copolymer according to claim 1, wherein the polyether (c) is used at a concentration such that the molar ratio of polyether-bonded double bonds to siloxane-bonded Si—H groups is in the range of 0.95-1.05.

4. The polyether siloxane block copolymer according to claim 1, wherein the hydrosilylation catalyst (d) used for the reaction is selected from the group of platinum catalysts.

5. The polyether siloxane block copolymer according to claim 1, wherein the polyether siloxane has an average molar mass $M_w$, that can be determined by GPC, of at least 60,000 g/mol.

6. The polyether siloxane block copolymer according to claim 1, wherein alpha-omega hydrogen siloxane and higher-order hydrogen siloxane are not provided separately but a siloxane composition comprising alpha-omega hydrogen siloxane and higher-order hydrogen siloxane is provided directly by equilibration, which corresponds to formula (4),

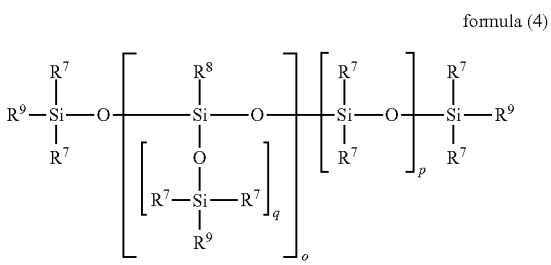
formula (4)

wherein o=0.01 to 0.7, p=0 to 100, wherein the radicals $R^7$ are each independently identical or different monovalent aliphatic or aromatic hydrocarbon radicals having 1 to 20 carbon atoms, and wherein the radicals $R^8$ are each independently identical or different monovalent aliphatic or aromatic hydrocarbon radicals having 1 to 20 carbon atoms, and wherein the radicals $R^9$ are each independently identical or different monovalent aliphatic or aromatic hydrocarbon radicals having 1 to 20 carbon atoms, or are H, wherein at least 50% of the $R^9$ radicals are hydrogen atoms, and which is then reacted directly with a polyether of formula (3).

7. The polyether siloxane block copolymer according to claim 1, wherein the reaction of the hydrogen siloxanes (a) and (h) with the polyether (c) in the presence of a hydrosilylation, catalyst (d), takes place mandatorily in a solvent.

8. The process for producing crosslinked polyether siloxane block copolymer comprising the reaction as specified in claim 1.

9. The polyether siloxane block copolymer according to claim 1, wherein k=5 to 50, and wherein the radicals $R^1$ are each independently identical or different monovalent aliphatic or aromatic hydrocarbon radicals having 1 to 10 carbon atoms, b) and at least one higher-order hydrogen siloxane of formula (2)

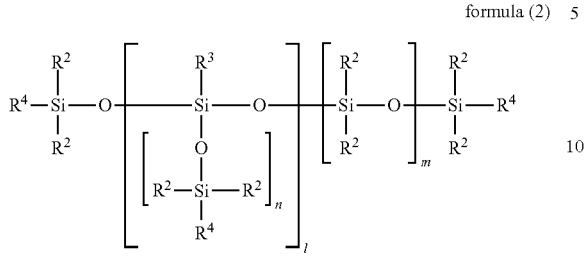

formula (2)

wherein
l=1 to 5,
m=5 to 50,
n=0 and
wherein the radicals $R^2$ are each independently identical or different monovalent aliphatic or aromatic hydrocarbon radicals having 1 to 10 carbon atoms, and
wherein the radicals $R^3$ are methyl or phenyl radicals, and
wherein the radicals $R^4$ are each independently identical or different monovalent aliphatic or aromatic hydrocarbon radicals having 1 to 20 carbon atoms, or are H,
wherein as least three $R^4$ radicals are hydrogen atoms,
c) with at least one polyether of formula (3)

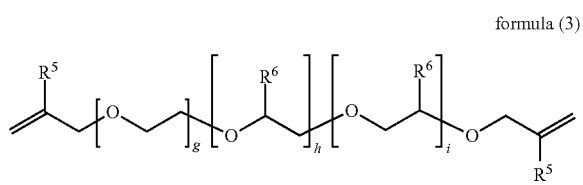

formula (3)

wherein
g=5 to 75,
h=5 to 75,
i=5 to 75, and
wherein the radicals $R^5$ are methyl radicals, and
wherein the radicals $R^6$ are methyl radicals.

10. The polyether siloxane block copolymer according to claim 1, wherein
k=8 to 20, and
wherein the radicals $R^1$ are methyl radicals,
b) and at least one higher-order hydrogen siloxane of formula (2)

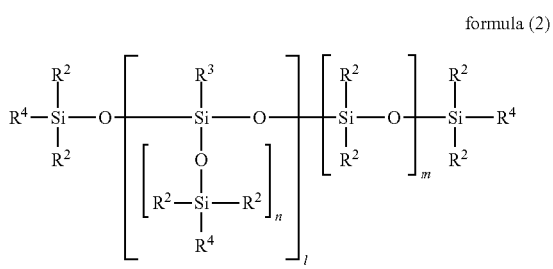

formula (2)

wherein
l=1,
m=8 to 20,
n=0 and wherein the radicals $R^2$ are methyl radicals, and
wherein the radicals $R^3$ are methyl or phenyl radicals, and
wherein the radicals Ware each independently identical or different monovalent aliphatic or aromatic hydrocarbon radicals having 1 to 20 carbon atoms, or are H,
wherein all $R^4$ radicals are hydrogen atoms,
c) with at least one polyether of formula (3)

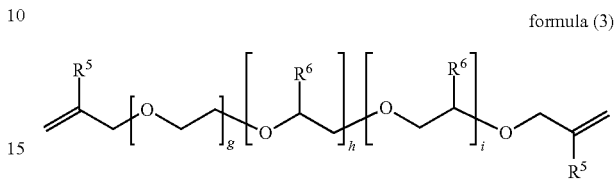

formula (3)

wherein
g=10 to 50,
h=5 to 25,
i=5 to 25, and
wherein the radicals $R^5$ are methyl radicals, and
wherein the radicals R b are methyl radicals.

11. The polyether siloxane block copolymer according to claim 1, wherein the polyether (c) is used at a concentration such that the molar ratio of polyether-bonded double bonds to siloxane-bonded Si—H groups is in the range of 0.99:1.01.

12. The polyether siloxane block copolymer according to claim 1, wherein the hydrosilylation catalyst (d) used for the reaction is a platinum (0) catalyst in the form of the Karstedt catalyst.

13. The polyether siloxane block copolymer according to claim 1, wherein the polyurethane foam to be produced is a mechanically foamed polyurethane foam, which comprises less than 2% by weight, of a chemical or physical blowing agent.

14. The polyether siloxane block copolymer according to claim 1, wherein the polyether siloxane block copolymer is used at a concentration of 0.05 10% by weight, based on the overall foam composition.

15. The polyether siloxane block copolymer for producing polyurethane foams according to claim 1, wherein, in addition to the polyether siloxane block copolymer, at least one further polyether siloxane of formula (5) is used as additive:

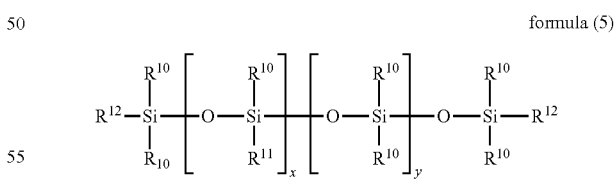

formula (5)

wherein
x=0 to 50,
y==0 to 250,
wherein the radicals $R^{10}$ are each independently identical or different monovalent aliphatic or aromatic hydrocarbon radicals having 1 to 20 carbon atoms, and wherein the radicals $R^{11}$ are each independently identical or different OH-functional or terminated, and wherein the radicals $R^{12}$ correspond to either $R^{10}$ or $R^{11}$.

16. The polyether siloxane block copolymer for producing polyurethane foams according to claim 1, wherein the polyether siloxane of formula (5) is used at a concentration of 10 90% by weight, based on the mixture of polyether siloxane block copolymer and polyether siloxane of formula (5).

17. The polyurethane foam produced according to claim 1.

18. The polyurethane foam according to claim 17 for producing floor coverings such as carpets, impact sound insulation or synthetic turf and also for producing textile coatings or sealing materials.

19. The polyether siloxane block copolymer according to claim 1, wherein the higher-order hydrogen siloxane (h) is used at a concentration of 7.5 15 based on the mixture of both hydrogen siloxanes (a) and (b).

* * * * *